United States Patent [19]
Ruthner

[11] Patent Number: 5,911,967
[45] Date of Patent: Jun. 15, 1999

[54] PROCESS AND APPARATUS FOR PRODUCTION OF FERRIC OXIDE FROM IRON CHLORIDE SOLUTIONS

[76] Inventor: Michael J. Ruthner, A-4865 Aichereben 11, Nussdorf, Austria

[21] Appl. No.: 08/997,779

[22] Filed: Dec. 24, 1997

[30] Foreign Application Priority Data

Dec. 27, 1996 [EP] European Pat. Off. .............. 96120935

[51] Int. Cl.⁶ .............................. C21B 7/10; C01G 1/00; C01G 49/02; C01B 7/07

[52] U.S. Cl. .................. 423/632; 266/190; 266/191; 423/148; 423/151; 423/488; 423/630; 423/632; 423/633

[58] Field of Search ..................... 423/632, 633, 423/630, 148, 151, 488; 266/190, 191

[56] References Cited

U.S. PATENT DOCUMENTS

| | | | |
|---|---|---|---|
| 3,310,435 | 3/1967 | Robinson et al. | 134/3 |
| 3,658,483 | 4/1972 | Lieunau et al. | 23/263 |
| 4,049,788 | 9/1977 | Bierbach et al. | 423/592 |
| 4,083,693 | 4/1978 | Hansen | 23/262 |
| 4,086,321 | 4/1978 | Holley et al. | 423/150 |
| 4,107,267 | 8/1978 | Hansen | 423/138 |
| 4,216,011 | 8/1980 | Martinez Vera et al. | 75/91 |
| 5,401,485 | 3/1995 | Hamilton . | |
| 5,597,547 | 1/1997 | Hamilton, Jr. | 423/632 |
| 5,635,152 | 6/1997 | Walpole | 423/481 |

FOREIGN PATENT DOCUMENTS 2 420 509  10/1979  France .

OTHER PUBLICATIONS

Abstract, Database WP1, Section Ch, Week 9314, Derwent Publications Ltd., XP002029973 & JP 05 051 218 A (Nippon Steel Corp.), Mar. 2, 1993.

Abstract, Database WP1, Section Ch, Week 9436, Derwent Publications Ltd., XP002029974 & WO 94 19283 A (Nippon Steel Corp.), Sep. 1, 1994.

Abstract, Chemical Abstracts, vol. 112, No. 12, XP000157542 & JP 01 192 729 A (Sumitomo Metal Industries Ltd.), Aug. 2, 1989.

Abstract, Database WP1, Section Ch, Week 9516, Derwent Publications Ltd., XP002029975 & JP 07 041 320 A (Kawasaki Steel Corp.), Feb. 10, 1995.

Olsen, John C. Unit Processes and Principles of Chemical Engineering. New York: D. Van Nostrand Company, Inc., Jul. 5, 1932.

*Primary Examiner*—Gary P. Straub
*Assistant Examiner*—Cam N. Nguyen
*Attorney, Agent, or Firm*—Evenson, McKeown, Edwards & Lenahan P.L.L.C.

[57] ABSTRACT

A process and an apparatus for the production of iron oxides having low chloride ion content comprising charging of a free HCl containing iron chloride solution into a spray roaster with a feeding device and a spray boom for charging the iron chloride containing solution into a reaction chamber heated by combustion gases thermally decomposing the solution into iron oxide, HCl gas and reaction gases a discharging device for the iron oxide and a cooling zone between the burner's focal plane and the discharging device cooling of iron oxide granules to temperatures at less than 450° C. reducing the concentration of HCl gas to less than 10 volume percent charging the layer of iron oxide granules onto a conveyor plate charged with hot steam and feeding the exhaust gases into the central combustion duct of the spray roaster. The resulting iron oxide has a residual chloride ion content of less than 500 ppm Cl⁻ and a specific surface area in excess of 3.5 m³/g.

16 Claims, 1 Drawing Sheet

PROCESS AND APPARATUS FOR PRODUCTION OF FERRIC OXIDE FROM IRON CHLORIDE SOLUTIONS

FIELD OF INVENTION

The present invention relates to the field of iron oxides. More particularly it relates to a process and arrangement of an apparatus for the production of spray roasted iron oxide containing substantially reduced amounts of chloride ions.

BACKGROUND OF THE INVENTION

The invention relates to a process and an apparatus for the production of iron oxides containing little amounts of residual chlorides originating from free hydrochloric acid containing iron chloride solutions, which are fed into a directly fired reaction chamber heated through burner chambers, yielding iron oxide and regenerated hydrochloric acid by means of spray roasting.

During the production of spray roasted iron oxide by means of thermal decomposition of free hydrochloric acid containing iron chloride solutions originating from steel pickling operations and generally containing between 800 up to 3000 ppm of Cl, it is not possible to retain a specific surface area larger than 3.5 $m^2/g$ and at the same time reduce the residual chloride ions content of related iron oxide to less than 500 ppm.

For example, K. Suganuma et al. concluded in their publication 'Removal of chloride ions from hematite powders for ferrite production' ("Advances in Ceramics" Vol. 15, p. 81–85, The American Ceramic Society Inc., Columbus, Ohio, 1986), that it is possible to lower the chloride ion content by means of several hours long treatments with $H_2O$ and/or $SO_3$ at the expense of reducing the specific surface area at the same time. In addition a non-desirable amount of sulfur will be picked up by the iron oxide. Furthermore subsequent rotary kiln treatments with ammonia and with heated screw feeders using steam injection are known.

On an industrial scale this problem is presently solved by employing serveral unit processes like washing with deionized water followed by spray drying and subsequent milling. These additional unit processes are elaborate and cost intensive.

Furthermore another process (WO 96/32355) for the reduction of chloride ions from regenerated iron oxides, originating from the thermal decomposition of hydrochloric acid containing iron chloride solutions, is known. This process proposes subsequent mixing of iron oxide with metal hydroxides along with a thermal treatment in order to reduce chloride ions, but no reference is made in connection with the reduction of the specific surface area.

TDK Electronics Co. in Japanese Patent Application 47-39477 discloses a process for the conversion of beta-FeOOH, containing 2.5 wt. % chloride ions, into alpha-$Fe_2O_3$ at 450° C. However no reference is made regarding the possible reduction of chloride ions.

A substantial disadvantage for processing synthetic, regenerated iron oxides originates from the highly corrosive nature of chloride ions even at low concentration levels in respect of construction materials over a wide temperature range Furthermore it is known, that the magnetic and mechanic properties of ferrite materials, which have been produced from synthetic regenerated iron oxides, are drastically influenced by the presence of chloride ions.

Thus, it would be desirable to have a process and device, which produces granules of iron oxides exhibiting a specific surface area in excess of 3.5 $m^2/g$ and reduces the chloride ion content temporarly, without using excessive unit processing, to less than 500 ppm.

In order to accomplish this task, the present invention provides a process for the production of iron oxides produced from free acid containing iron chloride solutions comprising spraying said solution into a reaction chamber which is directly fired by means of a burner chamber, spray roasting iron oxide and regenerated hydrochloric acid, cooling the spray roasted iron oxide granules down to temperatures of less than 450° C. after passing the burner's focal plane by means of a cooling gas, and discharging said iron oxide granules.

In addition, an apparatus for the production of iron oxides comprising a spray roaster which comprises a spraying device for spraying charged iron chloride solution into a reaction chamber which is directly heated by a burner chamber by which the solution is thermally decomposed into iron oxide granules, HCl gas and combustion gases, an exhaust for the HCl gas containing combustion gases and a discharge device for iron oxide granules, and a cooling zone between the burner chamber's focal plane and the iron oxide discharging device for spray roasted iron oxide granules is provided.

SUMMARY OF INVENTION

The process and installation used for the production of iron oxides by means of spray roasting provides feeding of an iron chloride solution by means of spray nozzles from the top of a spray roaster into a directly heated reaction chamber. The combustion gases circulate in a counter-current upward mode in respect to the sprayed solution. The temperature of the reaction chamber one met above the burner's focal plane, measured at the off-gases is around 400° C. and in the burner zone around 750° C. preferably 650° C. In this reaction zone the thermal decomposition of the iron chloride solution occurs according to the following equation;

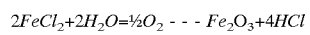

$$2FeCl_2 + 2H_2O = \tfrac{1}{2}O_2 \ \text{---} \ Fe_2O_3 + 4HCl$$

The iron oxide ($Fe_2O_3$) drops down from the reaction zone of the spray roaster and becomes discharged by means of sealing valves at temperatures between 450° C. and 580° C.

According to the present invention, a cooling zone is provided between the burner zone and the bottom discharge of the iron oxide granules, which is directly fed from outside by cooling gases preferably having a temperature between −40° C. and +40° C. and cools the iron oxide granules down to a temperature of less than 450° C., preferably between 350° C. and 400° C. At the same time the volume percent of HCl gas between the burner zone and the bottom discharge, measured 0.5 meter above the bottom discharge, is reduced to less than 10 volume percent, preferably less than 2 volume percent.

After the iron oxide granules are discharged from the bottom of the spray roaster the iron oxide granules are kept in a hot state and become directly fed to a heated vibrating conveyor plate forming iron oxide layers of less than ten millimeters, preferably between 2 and 5 millimeters. The iron oxide layer may directly or indirectly be heated or cooled. The transport of layered iron oxide may occur in a concurrent or counter-current mode in respect to the charged hot steam. The steam treatment may last less than 5 minutes, preferably less than 2 minutes and particularly less than one minute. The resulting iron oxide granules exhibit a specific surface area larger than 3.5 m²/g, particularly larger than 4.5 m²/g and a chloride ion content of less than 500 ppm, particularly less than 100 or 50 ppm respectively.

BRIEF DESCRIPTION OF THE DRAWINGS

Other objects, advantages and novel features of the present invention will become apparent from the following detailed description of the invention when considered in conjunction with the accompanying drawings.

The sole figure is a schematic view of the apparatus of the instant invention.

Figure 1:
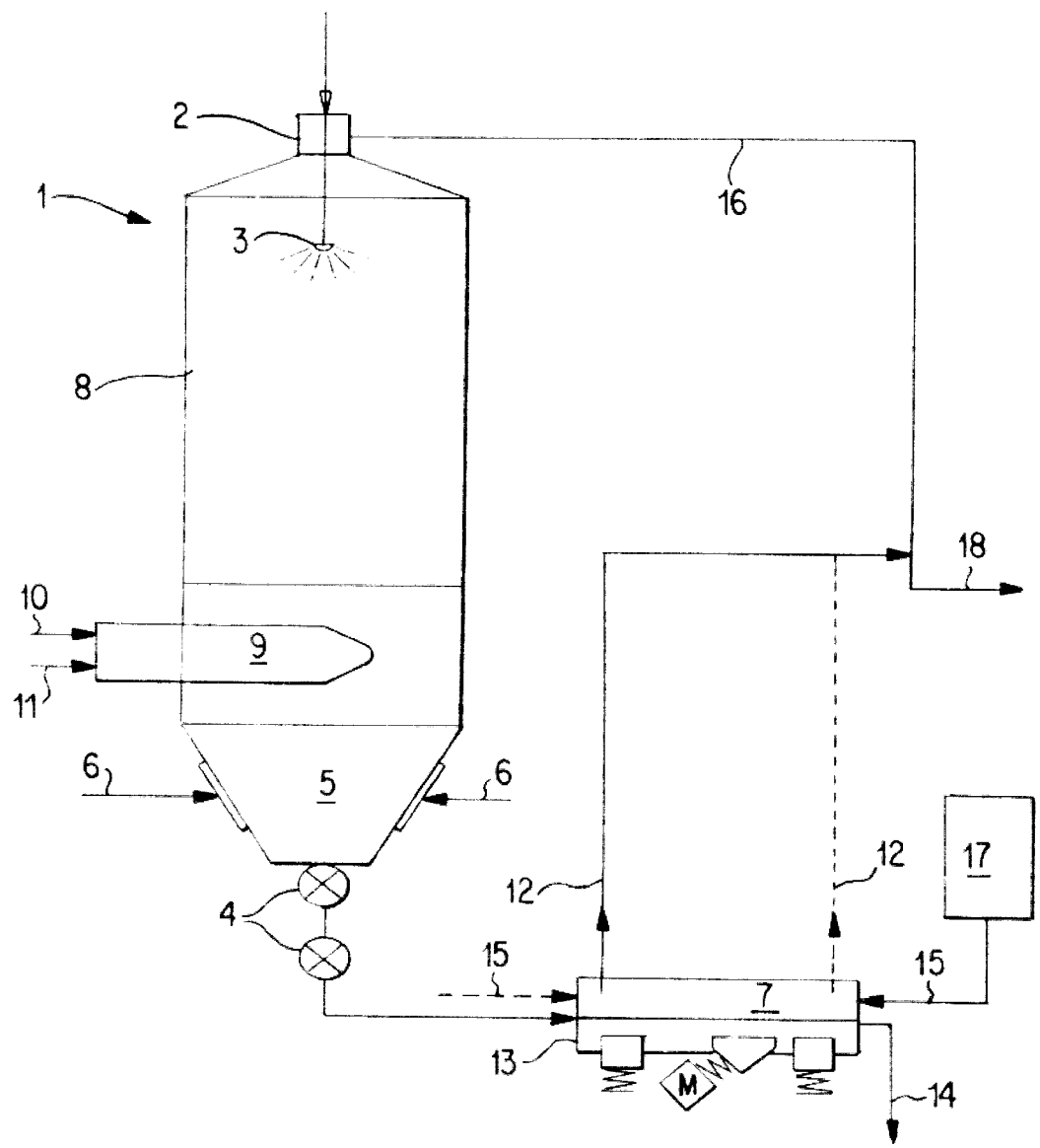

According to established practise, an aqueous and free hydrochloric acid containing iron chloride solution with 195 g total HCl/2 and 120 g Fe/l is charged from the top into the spray roaster (1) by means of a feeding device (2). The iron chloride solution is charged through the spray head (3) into the hot reaction chamber (8) in a counter-current way in respect to the rising and circulating combustion gases and is heated up to a temperature of about 650° C. at the burner's focal plane.

At the focal plane one or more burner chambers (9) are installed along with pipings for fuel (10) and air supply (11). The fuel and air burn out within the burner chamber (9) the combustion gases are introduced tangentially into the spray roaster. The combustion gases rise upward in a cyclonic mode in the counter-current direction of the charged and sprayed solution.

Within the reaction chamber the free acid containing iron chloride solution is thermally decomposed into iron oxide, HCl gas and combustion gases. HCl containing gases are dicharged together with the combustion gases by means of a gas exhaust tube on top of the spray roaster (1). The concentration of HCl gases at the exhaust duct (16) is about 10 to 12.5 volume percent.

Contrary to established practise, the present invention provides a cooling zone (5) located below the burner's focal plane by means of introducing cooling gases by way of a cool gas duct inlet (6). Via charging the cool gases below the burner's focal plane the concentration of hydrochloric acid gas becomes reduced below 10 volume percent particularly below 2 volume percent at the cone of the spray roaster. At the same time the spray roasted iron oxide granules are cooled down to temperatures less than 450° C. particularly to temperatures between 300° C. and 400° C. This causes a rapid cooling of iron oxide granules down to temperatures, which will delay collapse of primary crystals.

At the cone of the spray roaster (1) exists a discharging device (4) for the iron oxide granules, which may be in the form of any sluice or rotary valve. The hot discharged iron oxide granules are kept at temperature and are directly fed in the form of a layer (7) on an directly heated conveyor plate, which is also kept at hot is charged with hot steam acting upon the iron oxide granule layer (7). The iron oxide granule layer may be transported on a vibrating conveyor plate comprising a conveying agent (13) in the direction of transport, which is indicated by means of an arrow in FIG. 1 at the discharge of the iron oxide granules (14). The iron oxide granule layer (7), at a layer thickness of less than 20 millimeters preferably less than 10 millimeters, is treated in a concurrent or counter-current way in respect to the direction of transport with hot steam (15) originating from a hot steam boiler (17). The hot steam treatment (e.g.: saturated steam) takes less than 5 minutes preferably less than 1 minute. Above the iron oxide granule layer (7) exists a hot steam guide plate e.g. in form of a steel strip covering hood. The waste gases are preferably discharged to the off-gas pipe (18) of the spray roaster by way of waste gas exhausts (12) which are either located at the entry or exit of the heated conveyor plate's covering hood depending on the concurrent or counter-current mode of hot steam transport (15).

In Example 1 of the present invention ambient air at a temperature of 5° C. has been charged to provide a cooling zone (5) at about half way between the burner's focal plane and the discharge device at the cone of the spray roaster. The air was charged by means of perforated bottom linings and the iron oxide granules were cooled down to a temperature of 375° C. The concentration of the ambient HCl gas at the discharge device was measured at 1.8 volume percent. The residual chloride ion content of the iron oxide granules after the discharge device (4) was measured at 760 ppm. A layer of hot iron oxide granules was built up on an indirecty heated plate, which was constructed in the form of a vibrating feeder. Providing a retention time of 15 minutes and a constant layer thickness of 3.5 millimeters the iron oxide layer was treated with saturated steam in a counter-current mode at 380° C. After cooling the iron oxide granules had a residual chloride ion content of 82 ppm and a specific surface area of 5.2 m²/g. These results are shown for Example 1 in Table 1.

A test carried out according to Example 2 indicated, with iron oxide granules cooled down at 325° C. a further reduction of the residual chloride ion content connected with a further increase in specific surface area.

TABLE 1

| | | Residual Chloride Ion Content & Specific Surface Area | | | |
| --- | --- | --- | --- | --- | --- |
| | | Dishcarge Device (4) | | Silo* or Discharge Device (14) | |
| N° | Iron Oxide Source | Temperature ° C. | ppm Cl' | m²/g | ppm Cl' | m²/g |
| 1 | Steel Mill* | 485 | 1200 | 3.5 | 1350 | 3.4 |
| 2 | Steel Mill* | 452 | 1600 | 4.5 | 1750 | 4.4 |
| 3 | Example 1 | 375 | 760 | 5.1 | 82 | 5.2 |
| 4 | Example 2 | 325 | 485 | 5.8 | 45 | 5.9 |

What claimed is:

1. A process for the production of granules of iron oxides produced from a free hydrochloric acid containing iron chloride solution comprising:

spraying said solution into a reaction chamber of a spray roaster, said reaction chamber being directly fired by at least one burner, generating iron oxide granules and hydrochloric acid gas in said reaction chamber, cooling said spray roasted iron oxide granules to a temperature of 300° C. to 450° C. by a cooling gas and simultaneously lowering the hydrochloric acid gas concentration in a cooling zone located beneath the focal plane of the at least one burner inside the spray roaster, discharging said cooled iron oxide granules from the bottom of the spray roaster, feeding said iron oxide granules in the form of a layer having a thickness of less than 20 millimeters onto a conveyor plate, and treating said iron oxide granules on the conveyor plate with steam.

2. A process according to claim 1, further comprising reducing the hydrochloric acid gas concentration within the cooling zone to less than 10 volume percent.

3. A process according to claim 1, wherein air is used as the cooling gas within the cooling zone.

4. A process according to claim 1, wherein the steam treating occurs between 250° C. and 420° C.

5. A process according to claim 1, wherein the steam treating is carried out over a time of less than 5 minutes.

6. A process according to claim 2, wherein the HCl gas concentration is reduced to less than 5 volume percent.

7. A process according to claim 1, wherein said cooling of said spray roasted iron oxide granules is to a temperature between 350° C. and 420° C.

8. A process according to claim 6, wherein the HCl gas concentration is 2 volume percent.

9. A process according to claim 1, wherein the hot iron oxide granules are less than 10 millimeters.

10. The process according to claim 1, wherein the layer has a thickness of less than 10 millimeters.

11. The process according to claim 1, wherein the steam treating is carried out over a time of less than 1 minute.

12. The process according to claim 1, wherein said iron oxide granules have a specific surface area larger than 3.5 $m^2/g$.

13. The process according to claim 1, wherein said iron oxide granules have a specific surface area larger than 4.5 $m^2/g$.

14. The process according to claim 1, wherein said iron oxide granules have a chloride ion content of less than 500 ppm.

15. The process according to claim 1, wherein said iron oxide granules have a chloride ion content of less than 100 ppm.

16. The process according to claim 1, wherein said iron oxide granules have a chloride ion content of less than 50 ppm.

* * * * *